US009876955B2

(12) United States Patent
Kurosaki et al.

(10) Patent No.: US 9,876,955 B2
(45) Date of Patent: Jan. 23, 2018

(54) STANDBY PROCESS CONTROLLER AND STANDBY PROCESS CONTROL METHOD OF ELECTRONIC DEVICE

(71) Applicant: ALPINE ELECTRONICS, INC., Shinagawa-ku, Tokyo (JP)

(72) Inventors: Hironori Kurosaki, Iwaki (JP); Yuji Hirose, Iwaki (JP); Yoshinori Fujino, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 15/166,508

(22) Filed: May 27, 2016

(65) Prior Publication Data

US 2016/0360106 A1 Dec. 8, 2016

(30) Foreign Application Priority Data

Jun. 5, 2015 (JP) .................. 2015-114940

(51) Int. Cl.
*H04N 5/225* (2006.01)
*H04N 5/232* (2006.01)
*G06F 1/32* (2006.01)
*G06F 9/44* (2006.01)
*B60R 16/023* (2006.01)

(52) U.S. Cl.
CPC ....... *H04N 5/23241* (2013.01); *G06F 1/3203* (2013.01); *G06F 9/4418* (2013.01); *H04N 5/23293* (2013.01); *B60R 16/023* (2013.01)

(58) Field of Classification Search
CPC ............................................... H04N 5/23293

USPC ........................................................ 348/372
See application file for complete search history.

(56) References Cited

U.S. PATENT DOCUMENTS

| 2006/0047980 A1 | 3/2006 | Price et al. |
| 2013/0047019 A1* | 2/2013 | Higashi ............. H04N 1/00891 713/323 |
| 2013/0169861 A1* | 7/2013 | Yoshino ............. H04N 5/23241 348/372 |

(Continued)

FOREIGN PATENT DOCUMENTS

| EP | 1895388 | 3/2008 |
| GB | 2429083 | 2/2007 |
| JP | 2013-084089 | 5/2013 |

OTHER PUBLICATIONS

Extended European Search Report for Application No. 16172832.4 dated Oct. 13, 2016, 6 pgs.

*Primary Examiner* — Anthony J Daniels
(74) *Attorney, Agent, or Firm* — Brinks Gilson & Lione

(57) ABSTRACT

A standby process controller includes a mode control unit which is on standby without starting a standby-in process when a power-off signal is detected, stops audio and image output of an operation execution unit, sets a pre-standby mode to an electronic device so as to allow a standby-in process to be started and ended at any time, and releases the setting of the pre-standby mode when a power-on signal is detected, and a standby-in process start control unit which starts the standby-in process when a predetermined time elapses since the pre-standby mode is set. A standby-out process can be immediately performed in a case where a user performs a power-on operation within several seconds after a power-off operation is performed.

10 Claims, 9 Drawing Sheets

(56) References Cited

U.S. PATENT DOCUMENTS

2013/0201510 A1* 8/2013 Miyata ............... G03G 15/5004
358/1.13
2014/0119765 A1* 5/2014 Hosoda ............... G03G 15/5004
399/75

* cited by examiner

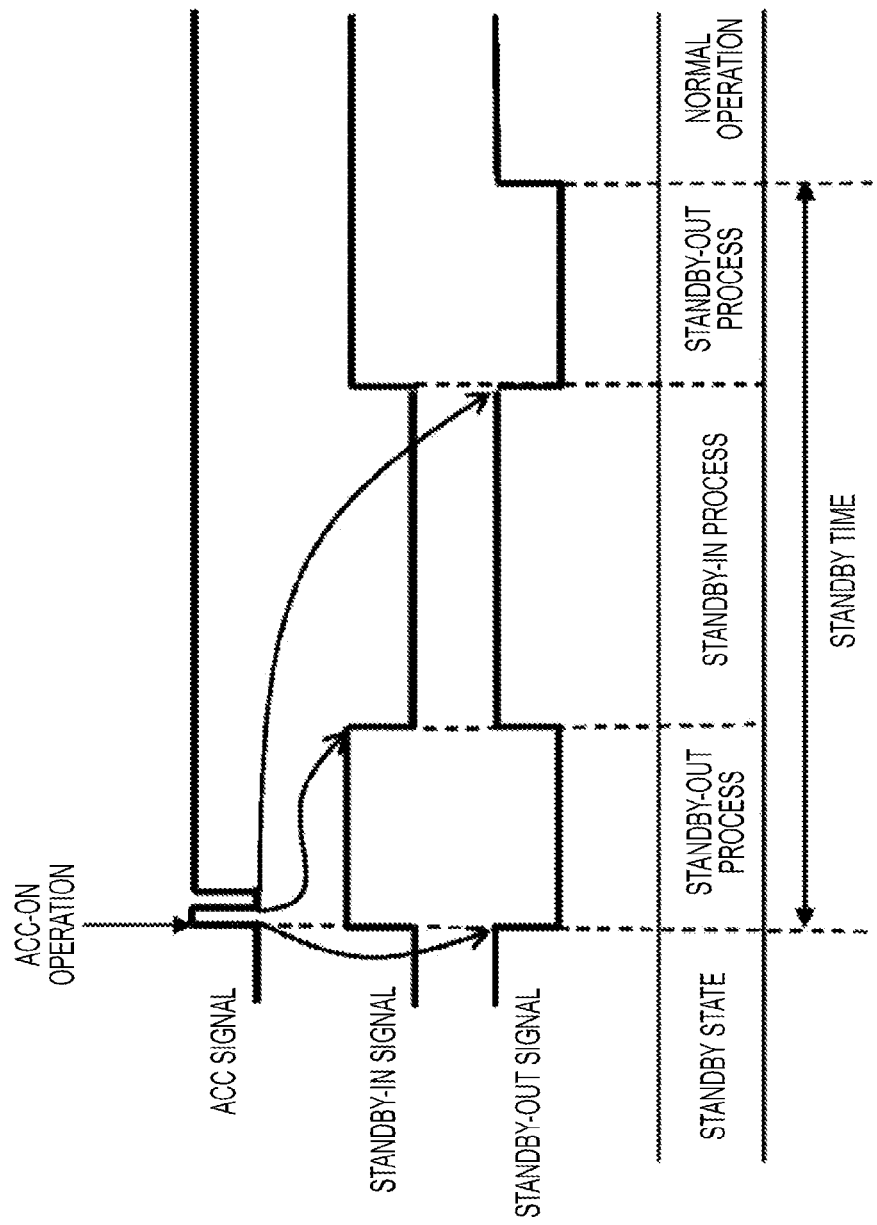

STANDBY PROCESS CONTROLLER AND STANDBY PROCESS CONTROL METHOD OF ELECTRONIC DEVICE

RELATED APPLICATION

The present application claims priority to Japanese Patent Application Number 2015-114940, filed Jun. 5, 2015, the entirety of which is hereby incorporated by reference.

BACKGROUND

1. Field of the Invention

The present invention relates to a standby process controller and a standby process control method of an electronic device, and is particularly suitable for a device which controls the operations of an activation process (a standby-out process) performed when the power of the electronic device is turned on and an end process (a standby-in process) performed when the power of the electronic device is turned off.

2. Description of the Related Art

In general, when the power of the electronic device in a standby state is turned on, a predetermined activation process (the standby-out process) is performed, and the electronic device enters an operable state. On the other hand, when the power of the running electronic device is turned off, a predetermined end process (the standby-in process) is performed, and the electronic device enters the standby state. The activation process and the end process (hereinafter, both processes will be referred to as "standby process") have no direct relation to a user's operation on the electronic device. Therefore, it is desirable to perform both processes in a time as short as possible.

For example, there is known a technique of preventing a delay in a soft activation when data is not normally updated and then an ACC (accessory) of the in-vehicle device is turned on (see JP 2013-84089 A). In the technique disclosed in JP 2013-84089 A, a CPU is activated without waiting for an activation factor when the backup of the data is not normally ended, and a memory is shifted from an "idle" state to a "tran" state (a CPU accessible state), so that the memory is already in the "tran" state at the time when the data is normally back up and then the ACC is turned on.

By the way, once the standby process is started, the standby process is not stopped during its operation but performed to the end. In other words, even when the power is switched to be turned on in a period before the process is completed after the standby-in process is started according to the turning-off operation of the power of the electronic device, the standby-in process is performed to the end, and then the standby-out process is started. Similarly, even when the power is switched to be turned off in a period before the process is completed after the standby-out process is started according to the turning-on operation of the power of the electronic device, the standby-out process is performed to the end, and then the standby-in process is started.

Therefore, for example, in a case where the user wants to use the electronic device again by turning on the power within several seconds after the user turns off the power of the electronic device, it takes a considerably long time until the electronic device enters an operable state after the standby-out process is completed. FIG. 8 is a diagram for describing the problem.

In FIG. 8, an ACC signal indicates a signal of turning on/off the power (accessory), and a high state indicates a power ON and a low state indicates a power OFF. A standby-in signal is a signal of instructing the execution of the standby-in process, and is active low. A standby-out signal is a signal of instructing the execution of the standby-out process, and is active low.

As illustrated in FIG. 8, in a case where the ACC-OFF operation is performed when the electronic device is in a normal operation state, the standby-in signal also falls down in synchronization with a falling of the ACC signal, and the standby-in process is started. In general, the standby-in process requires a time of about 5 to 15 seconds. The example of FIG. 8 shows a state in which the ACC-ON operation is performed before the standby-in process is completed.

However, even when the ACC is switched to be turned on during the standby-in process, the standby-in process is continuously performed to the end, and then the standby-out process is started. Then, when the standby-out process is completed, it becomes the normal operation state where the electronic device can be used. Therefore, it takes a considerably long standby time until the electronic device enters an operable state after the ACC is turned on.

In addition, in the electronic device mounted on a specific vehicle, when the ACC-ON operation is performed, the ACC signal is configured to rise and then fall down once, and thereafter rise again as illustrated in FIG. 9. In this case, after the standby-out process is performed to the end according to the first rising of the ACC signal, the standby-in process is performed to the end according to a falling of the ACC signal. Further, the standby-out process is performed again to the end according to the next rising of the ACC signal, and finally the electronic device enters the operable state. Therefore, it takes a considerably long standby time until the electronic device enters the operable state after the ACC-ON operation is performed.

Conventionally, a guard time is set for the electronic device mounted to such a specific vehicle in order to cancel all the signals during several seconds (about 2 seconds) after the first rising of the ACC signal is detected, thereby avoiding a long standby time until the electronic device enters the operable state after the ACC-ON operation is performed.

However, even in such a condition and situation, in a case where the American standard that a captured image of the periphery of a vehicle has to be displayed within 2 seconds after the ACC is turned on is applied to the electronic device, the method of avoiding the standby time using the guard time cannot be employed. This is because even when a signal of instructing the display of the captured image immediately after the ACC is turned on is output, the signal is ignored by the guard time.

The invention has been made in view of the above problem, and an object thereof is to shorten a time taken until an electronic device enters an operable state after a power-on operation is performed.

SUMMARY

In order to solve the above problem, in the present disclosure, a pre-standby mode is set to the electronic device in which the standby-in process is on standby without being started when a power-off signal of the electronic device is detected, audio and image output is stopped, and the start and the end of the standby-in process are allowed at any time. Thereafter, when a power-on signal of the electronic device is detected, the setting of the pre-standby mode is released. In addition, in a case where the power-on signal is not detected within a predetermined time after the pre-standby mode is set, the standby-in process is started after a predetermined time elapses.

According to the embodiment configured as described above, even when a power-off signal of an electronic device is detected, a standby-in process is not immediately started. Therefore, in a case where the user turns on the power within several seconds after a power-off operation is performed, the standby-out process is immediately performed, and the electronic device can be set to the operable state because the standby-in process is not performed at the time when the power-on operation is performed. Therefore, it is possible to shorten a time taken until the electronic device enters the operable state after the power-on operation is performed.

Further, when a predetermined time elapses after the pre-standby mode is set according to the detection of the power-off signal of the electronic device, the standby-in process is started and the electronic device enters the standby state. In a case where the predetermined time elapses while the power-on signal is not detected after the user turns off the power, it is considered that the user is less likely to turn on the power, so that the electronic device can be shifted to the standby state by performing the standby-in process.

In addition, according to the present disclosure, when the user turns on the power, it is possible to shorten a time until the electronic device enters the operable state after the power is turned on even in the electronic device configured to continuously output the power-on signal, the power-off signal, and the power-on signal. In other words, when the first power-on signal is detected, the standby-out process is started. Then, when the power-off signal is detected immediately thereafter, the pre-standby mode is set, and the setting of the pre-standby mode is released according to the power-on signal detected immediately thereafter. Therefore, the standby-in process is not performed according to the second power-off signal, but the electronic device can enter the operable state only by performing the standby-out process.

BRIEF DESCRIPTION OF THE DRAWINGS

FIG. 9 is a diagram for describing a problem in the related art.

DETAILED DESCRIPTION OF THE PREFERRED EMBODIMENTS

Figure 1:
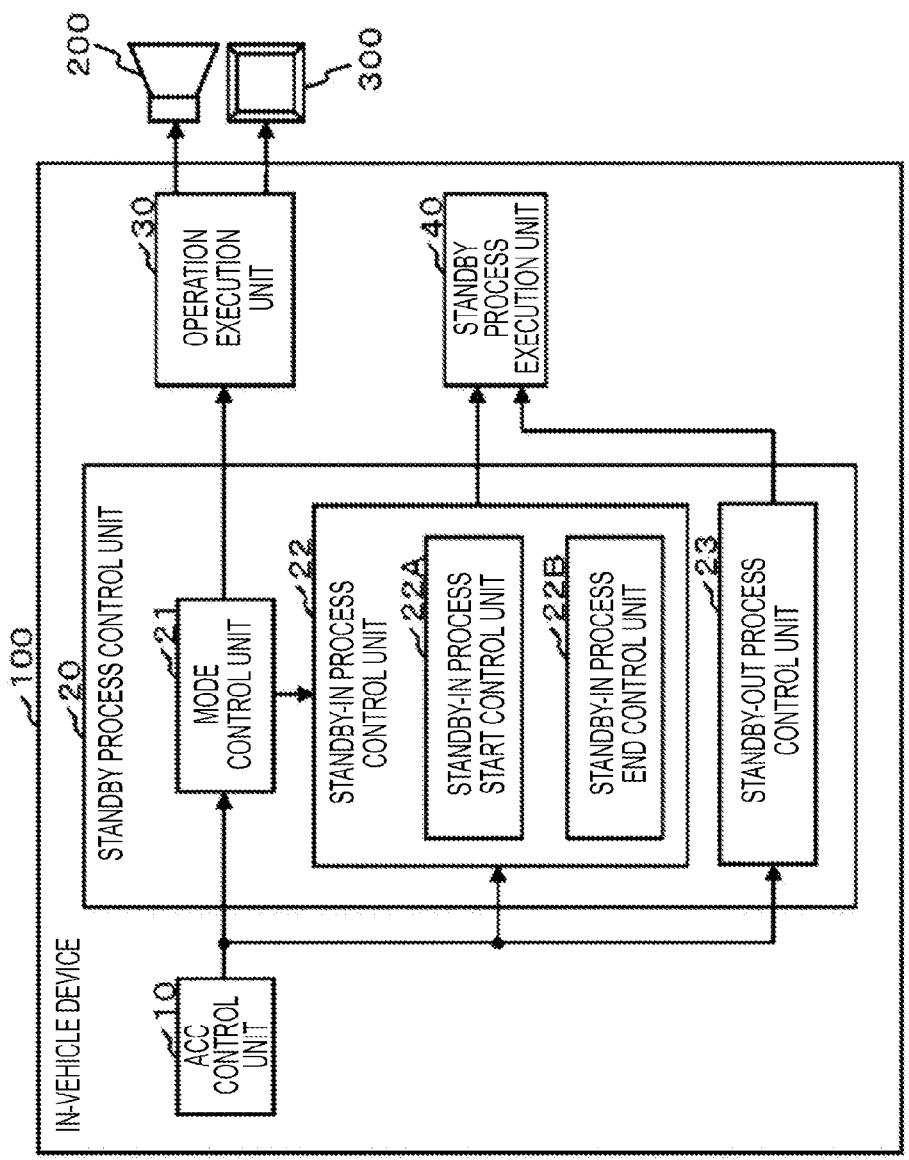
FIG. 1 is a block diagram illustrating an exemplary configuration of an in-vehicle device to which a standby process controller of an electronic device according to the embodiment is applied.

Hereinafter, an embodiment of the invention will be described based on the drawings. FIG. 1 is a block diagram illustrating an exemplary configuration of an in-vehicle device to which a standby process controller of an electronic device according to the embodiment is applied. As illustrated in FIG. 1, an in-vehicle device 100 of the embodiment includes an ACC control unit 10, a standby process control unit 20, an operation execution unit 30, and a standby process execution unit 40. In addition, the in-vehicle device 100 of the embodiment is connected to a speaker 200 and a display 300.

The standby process control unit 20 corresponds to the standby process controller of the electronic device according to the embodiment, and includes a mode control unit 21, a standby-in process control unit 22, and a standby-out process control unit 23 as its functional configurations. The standby-in process control unit 22 includes a standby-in process start control unit 22A and a standby-in process end control unit 22B.

The ACC control unit 10 performs power control of the ACC. Specifically, the ACC control unit 10 outputs an ACC-ON signal (a power-on signal) or an ACC-OFF signal (a power-off signal) according to an ACC-ON operation or an ACC-OFF operation of the user. In the embodiment, a rising of an ACC signal is set to the ACC-ON signal, and a falling of the ACC signal is set to the ACC-OFF signal.

The operation execution unit 30 controls a normal operation of the in-vehicle device 100. The normal operation means an operation normally performed by the in-vehicle device 100 during a period until a standby-in process is started according to the detection of the ACC-OFF signal after a standby-out process performed according to the detection of the ACC-ON signal is completed. For example, in a case where the in-vehicle device 100 is a navigator, the normal operation corresponds to a driving guide and a route search provided by the navigator. The operation execution unit 30 outputs various types of audio information to the speaker 200 as a result of the normal operation, and controls the display 300 to display various images.

The standby process execution unit 40 performs the standby-in process and the standby-out process under the control of the standby process control unit 20. In other words, the standby process execution unit 40 performs the standby-in process under the control of the standby process control unit 20 when the ACC-OFF signal is detected by the standby process control unit 20. In addition, the standby process execution unit 40 performs the standby-out process under the control of the standby process control unit 20 when the ACC-ON signal is detected by the standby process control unit 20.

As described above, the standby-in process control unit 22 of the standby process control unit 20 controls the standby process execution unit 40 to perform the standby-in process in a case where the ACC-OFF signal is detected by the standby process control unit 20. As described above, the standby-out process control unit 23 controls the standby process execution unit 40 to perform the standby-out process in a case where the ACC-ON signal is detected by the standby process control unit 20.

The mode control unit 21 sets a pre-standby mode to the in-vehicle device 100 according to the detection of the ACC-OFF signal output from the ACC control unit 10. The pre-standby mode is a mode in which the audio and image output of the operation execution unit 30 are stopped and the start and end of the standby-in process are allowed at any time without immediately performing the standby-in process. In addition, the mode control unit 21 releases the setting of the pre-standby mode according to the detection of the ACC-ON signal output from the ACC control unit 10.

The standby-in process start control unit 22A is on standby without immediately starting the standby-in process when the ACC-OFF signal output from the ACC control unit 10 is detected. Then, in a case where the ACC-ON signal is not detected within a predetermined time (for example, 45 seconds) after the pre-standby mode is set by the mode control unit 21, the standby process execution unit 40 is controlled to start the standby-in process when the predetermined time elapses.

In a case where the ACC-ON signal is detected during the standby-in process after the standby-in process start control unit 22A controls the standby process execution unit 40 to start the standby-in process when the predetermined time elapses since the pre-standby mode is set by the mode control unit 21, the standby-in process end control unit 22B forcibly ends the standby-in process. Therefore, it becomes a state where the standby-out process control unit 23 can immediately perform the standby-out process with respect to the standby process execution unit 40.

FIGS. 2 to 5 are diagrams illustrating the control operations performed by the standby process control unit 20 according to the embodiment having the above configuration. Further, in FIGS. 2 to 5, a standby-in signal, a standby-out signal, and a pre-standby signal are active low.

Figure 2:
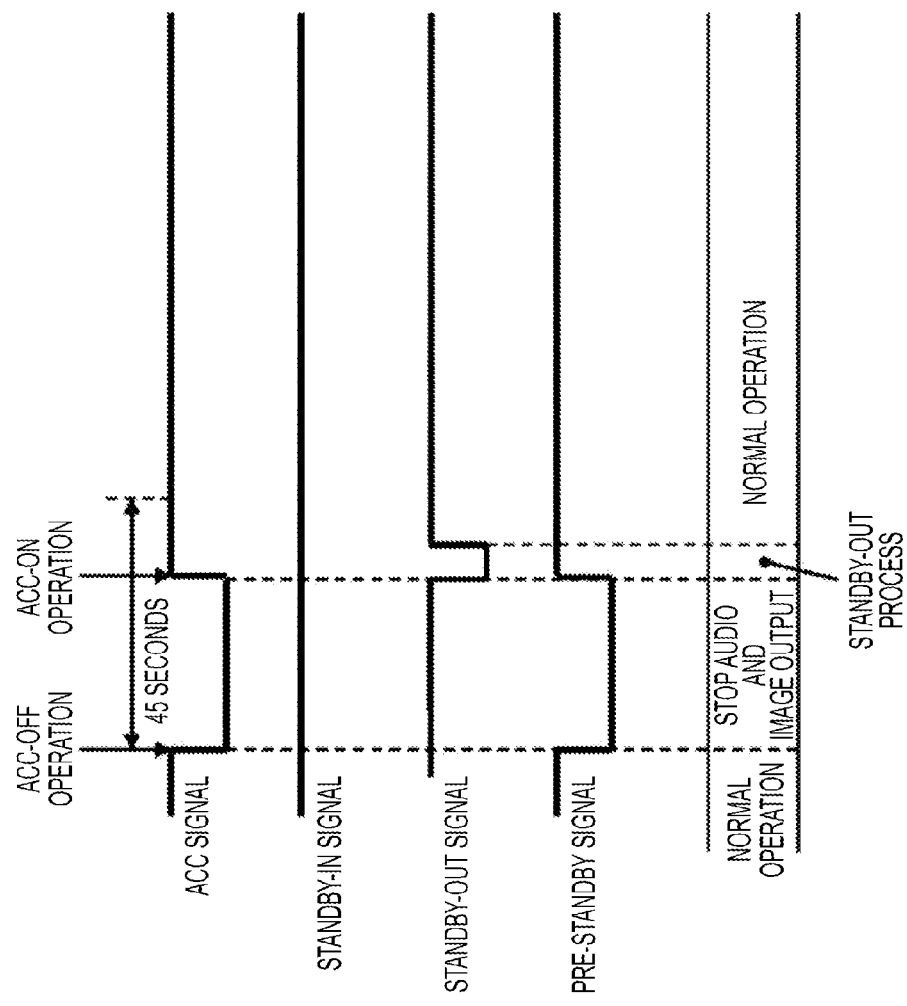
FIG. 2 is a diagram illustrating an operation example of a control operation of a standby process control unit according to the embodiment in a case where a user performs an ACC-ON operation within 45 seconds after an ACC-OFF operation.

FIG. 2 is a diagram illustrating an operation example in a case where the user performs the ACC-ON operation within 45 seconds after the ACC-OFF operation is performed. As illustrated in FIG. 2, in a case where the user performs the ACC-OFF operation when the normal operation of the in-vehicle device 100 is performed by the operation execution unit 30, the ACC control unit 10 lets down the ACC signal so as to output the ACC-OFF signal.

The mode control unit 21 sets the pre-standby mode by letting down the pre-standby signal supplied to the standby-in process control unit 22 and the operation execution unit 30 in synchronization with the detection of the ACC-OFF signal output from the ACC control unit 10. Therefore, the audio and image output of the operation execution unit 30 is stopped. At this time, the standby-in process start control unit 22A does not immediately let down the standby-in signal even when the ACC-OFF signal is detected, but is on standby without instructing the standby process execution unit 40 to start the standby-in process.

Thereafter, when the user performs the ACC-ON operation, the ACC control unit 10 outputs the ACC-ON signal by raising the ACC signal. The mode control unit 21 releases the setting of the pre-standby mode by raising the pre-standby signal supplied to the standby-in process control unit 22 and the operation execution unit 30 in synchronization with the detection of the ACC-ON signal output from the ACC control unit 10.

In addition, the standby-out process control unit 23 controls the standby process execution unit 40 to perform the standby-out process by letting down the standby-out signal supplied to the standby process execution unit 40 in synchronization with the detection of the ACC-ON signal output from the ACC control unit 10. Then, when the standby-out process is completed, the in-vehicle device 100 enters a state where the normal operation can be performed by the operation execution unit 30.

In this way, in a case where the ACC-ON operation is performed within 45 seconds after the user performs the ACC-OFF operation, the standby-out process can be performed immediately after the ACC-ON operation is performed without performing the standby-in process, and the in-vehicle device 100 can enter the state where the normal operation can be performed. Therefore, in a case where the user performs the ACC-ON operation on second thought after the ACC-OFF operation is performed, it is possible to shorten a time taken until the in-vehicle device 100 enters an operable state after the ACC-ON operation is performed. The standby time in this case is only a time taken for performing the standby-out process.

Figure 3:
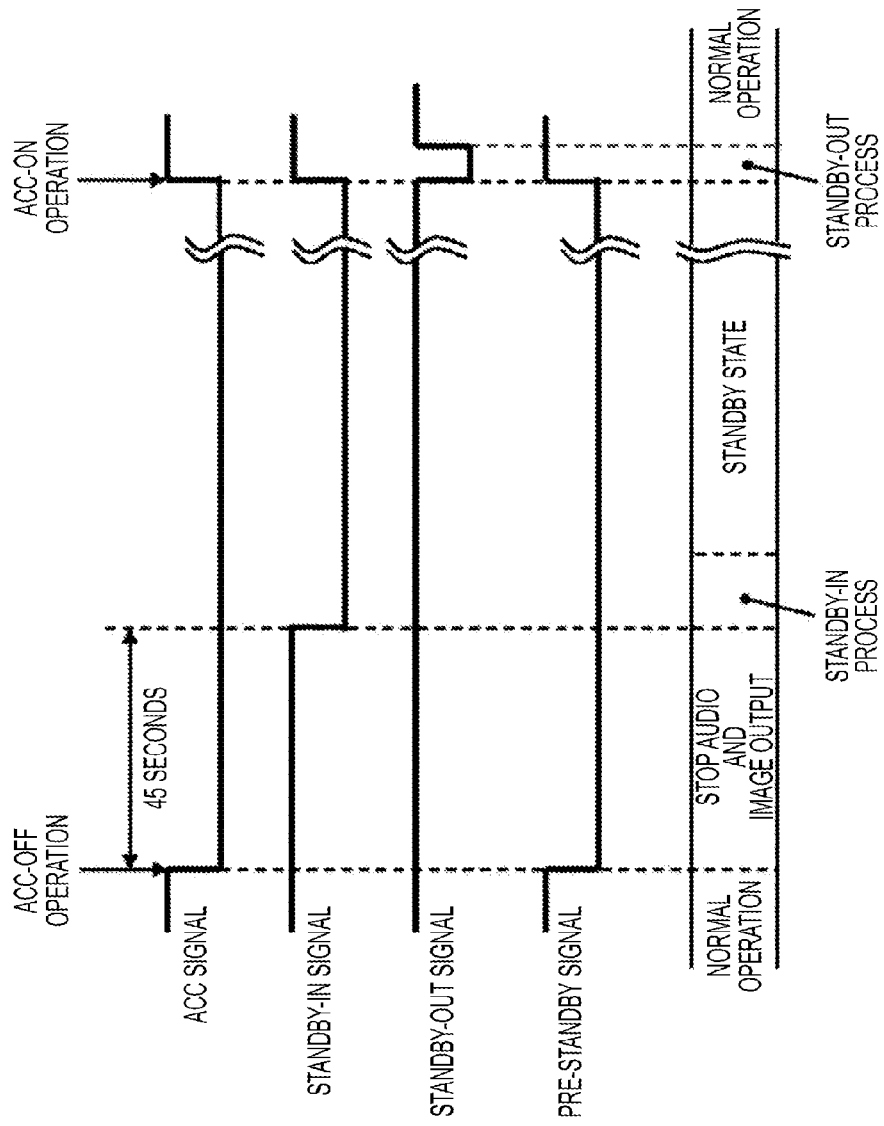
FIG. 3 is a diagram illustrating an operation example of a control operation of the standby process control unit according to the embodiment in a case where the user performs the ACC-ON operation after 45 seconds elapse since the ACC-OFF operation is performed.

FIG. 3 is a diagram illustrating an operation example in a case where the ACC-ON operation is performed after 45 seconds elapse since the user performs the ACC-OFF operation. This operation example typically shows a case where the user turns off the ACC and gets out of a vehicle but decides to get in the vehicle again so as to turn on the ACC.

As illustrated in FIG. 3, in a case where the user performs the ACC-OFF operation when the normal operation of the in-vehicle device 100 is performed by the operation execution unit 30, the ACC control unit 10 outputs the ACC-OFF signal by letting down the ACC signal. The mode control unit 21 sets the pre-standby mode by letting down the pre-standby signal in synchronization with the detection of the ACC-OFF signal output from the ACC control unit 10. Therefore, the audio and image output of the operation execution unit 30 is stopped. At this time, the standby-in process start control unit 22A does not immediately let down the standby-in signal even when the ACC-OFF signal is detected, but is on standby without instructing the standby process execution unit 40 to start the standby-in process.

Thereafter, when 45 seconds elapse since the pre-standby mode is set, the standby-in process start control unit 22A controls the standby process execution unit 40 to perform the standby-in process by letting down the standby-in signal. The in-vehicle device 100 enters a standby state when the standby-in process is completed.

Thereafter, when the user performs the ACC-ON operation, the ACC control unit 10 outputs the ACC-ON signal by raising the ACC signal. The mode control unit 21 releases the setting of the pre-standby mode by raising the pre-standby signal in synchronization with the detection of the ACC-ON signal output from the ACC control unit 10.

In addition, the standby-out process control unit 23 controls the standby process execution unit 40 to perform the standby-out process by letting down the standby-out signal supplied to the standby process execution unit 40 in synchronization with the detection of the ACC-ON signal output from the ACC control unit 10. Then, when the standby-out process is completed, the in-vehicle device 100 enters a state where the operation execution unit 30 can perform the normal operation.

In this way, when 45 seconds elapse since the user performs the ACC-OFF operation, the standby-in process is performed and the in-vehicle device 100 enters the standby state. In a case where 45 seconds elapse while the ACC-ON signal is not detected after the user performs the ACC-OFF operation, it is considered that the user is less likely to perform the ACC-ON operation on second thought, so that the in-vehicle device 100 can be shifted to the standby state by performing the standby-in process.

In a case where the user performs the ACC-ON operation after the in-vehicle device 100 enters the standby state, the standby-out process is performed immediately after the ACC-ON operation is performed without performing the standby-in process at that point of time, and the in-vehicle device 100 enters a state where the normal operation can be performed. Therefore, it is possible to shorten a time taken until the in-vehicle device 100 enters the operable state after the ACC-ON operation is performed. Even in this case, the standby time until the in-vehicle device 100 enters the operable state after the ACC-ON operation is performed is only a time taken for performing the standby-out process.

Figure 4:
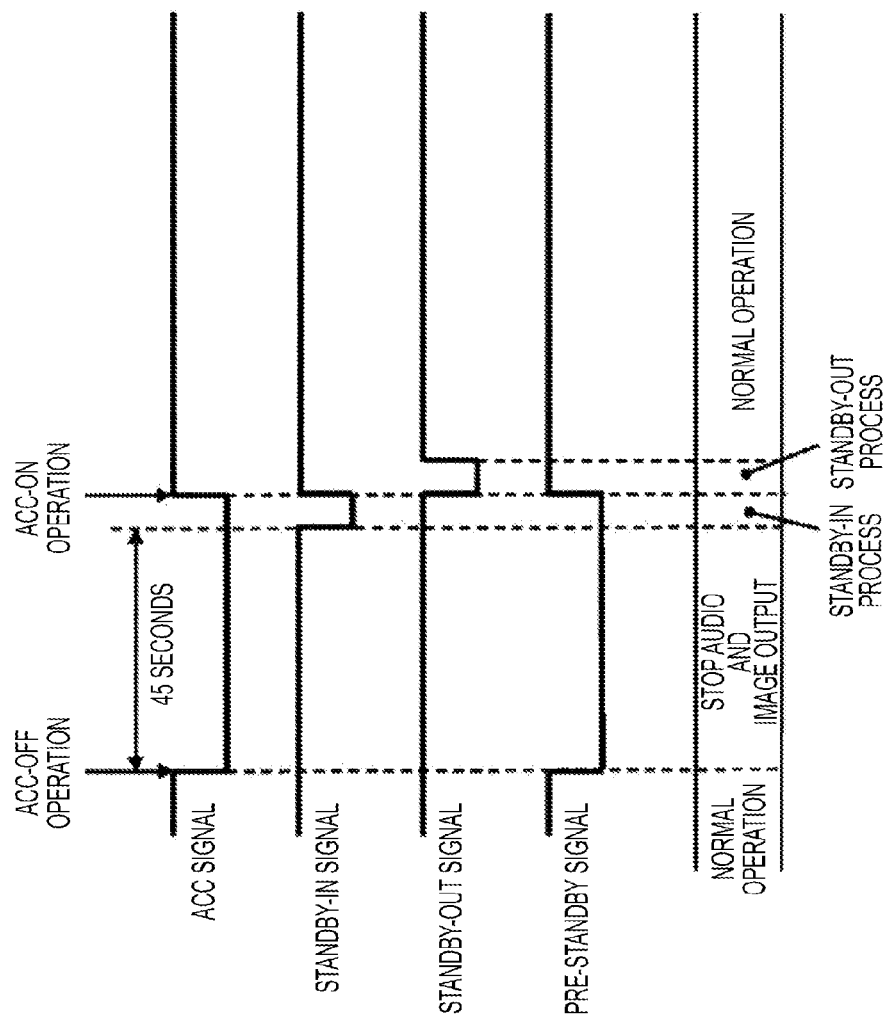
FIG. 4 is a diagram illustrating an operation example of a control operation of the standby process control unit according to the embodiment in a case where the user performs the ACC-ON operation during a standby-in process after 45 seconds elapse since the user performs the ACC-OFF operation.

FIG. 4 is a diagram illustrating an operation example in a case where the ACC-ON operation is performed during the standby-in process after 45 seconds elapse since the user performs the ACC-OFF operation. Although it may be considered that such a case rarely occurs, the operation example is to show that the time taken until the in-vehicle device 100 enters the operable state since the ACC-ON operation is performed is shortened even in such a case.

In FIG. 4, the operation from a time point when 45 seconds elapse after the pre-standby mode is set until the standby-in process is the same as that of the example of FIG. 3. In the example of FIG. 4, the user performs the ACC-ON operation before the standby-in process is completed.

When the user performs the ACC-ON operation, the ACC control unit 10 outputs the ACC-ON signal by raising the ACC signal. The mode control unit 21 releases the setting of the pre-standby mode by raising the pre-standby signal in synchronization with the detection of the ACC-ON signal output from the ACC control unit 10.

In addition, the standby-in process end control unit 22B controls the standby process execution unit 40 to forcibly terminate the running standby-in process by raising the standby-in signal. Therefore, the standby-out process control unit 23 enters a state where the standby process execution unit 40 can immediately perform the standby-out process.

The standby-out process control unit 23 controls the standby process execution unit 40 to perform the standby-out process by letting down the standby-out signal supplied to the standby process execution unit 40. Then, when the standby-out process is completed, the in-vehicle device 100 enters a state where the operation execution unit 30 can perform the normal operation.

In this way, in a case where the user performs the ACC-ON operation during the standby-in process after the standby-in process is started after 45 seconds elapse since the user performs the ACC-OFF operation, the pre-standby mode is set at this point of time, so that the standby-in process can be forcibly terminated. Therefore, the standby-out process is immediately performed, so that the in-vehicle device 100 can enter a state where the normal operation can be performed. Accordingly, it is possible to shorten a time taken until the in-vehicle device 100 enters the operable state after the ACC-ON operation is performed. Even in this case, the standby time until the in-vehicle device 100 enters the operable state after the ACC-ON operation is performed is only a time taken for performing the standby-out process.

Figure 5:
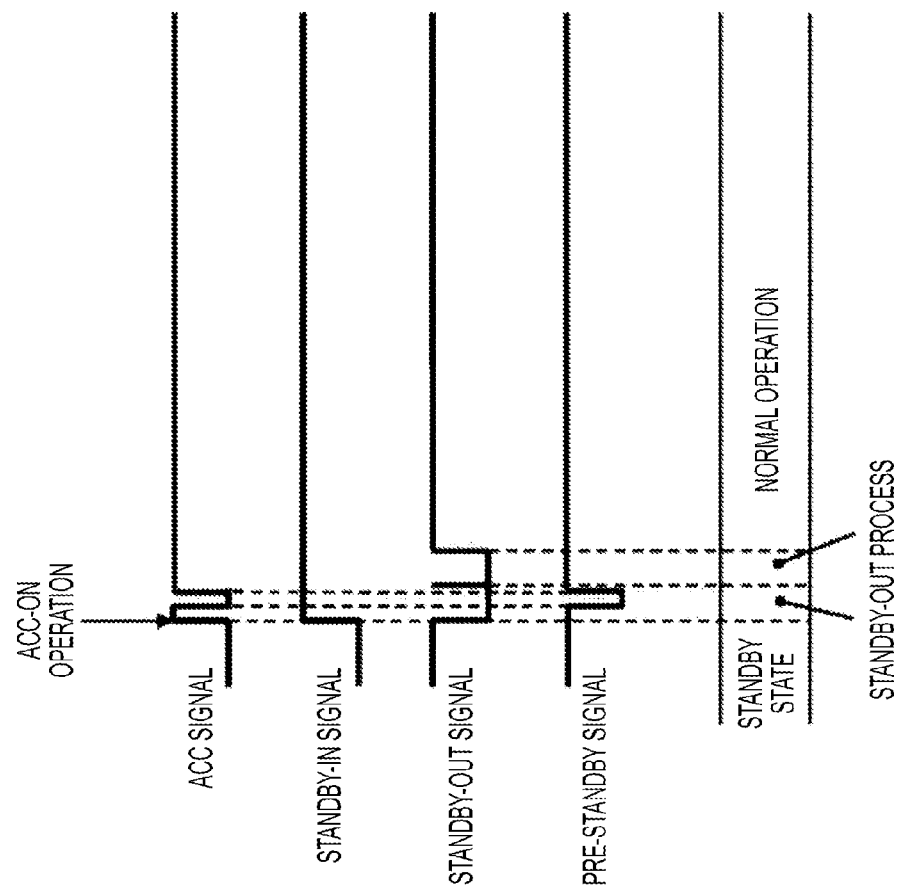
FIG. 5 is a diagram illustrating an operation example of a control operation of the standby process control unit according to the embodiment in which the in-vehicle device has a special specification that an ACC signal first rises and falls and then rises again when the user performs the ACC-ON operation.

FIG. 5 is a diagram illustrating an operation example of the in-vehicle device 100 which has a special specification that the ACC signal first rises and falls and then rises again when the user performs the ACC-ON operation.

As illustrated in FIG. 5, in a case where the user performs the ACC-ON operation when the in-vehicle device 100 is in the standby state, the ACC control unit 10 raises and lets down the ACC signal and then raises the signal again so as to serially output the ACC-ON signal, the ACC-OFF signal, and the ACC-ON signal.

In this case, the standby-out process control unit 23 controls the standby process execution unit 40 to perform the standby-out process according to the ACC-ON signal output at the first time. In addition, the mode control unit 21 sets the pre-standby mode according to the ACC-OFF signal output at the second time. Therefore, the audio and image output of the operation execution unit 30 is stopped.

Furthermore, the mode control unit 21 releases the setting of the pre-standby mode according to the ACC-ON signal output at the third time. In addition, the standby-out process control unit 23 controls the standby process execution unit 40 to serially perform the standby-out process at the second time after the standby-out process at the first time is ended. Then, when the standby-out process at the second time is completed, the in-vehicle device 100 enters a state where the operation execution unit 30 can perform the normal operation.

In this way, when the ACC-ON operation is performed by the user, the standby-in process is not performed according to the ACC-OFF signal at the second time even in the in-vehicle device 100 which is configured to serially output the ACC-ON signal, the ACC-OFF signal, and the ACC-ON signal. Therefore, it is possible to shorten a time taken until the in-vehicle device 100 enters the operable state after the ACC-ON operation is performed. Further, the American standard can also be satisfied as long as a total time taken for performing the standby-out process at the second time falls within 2 seconds.

Figure 6:
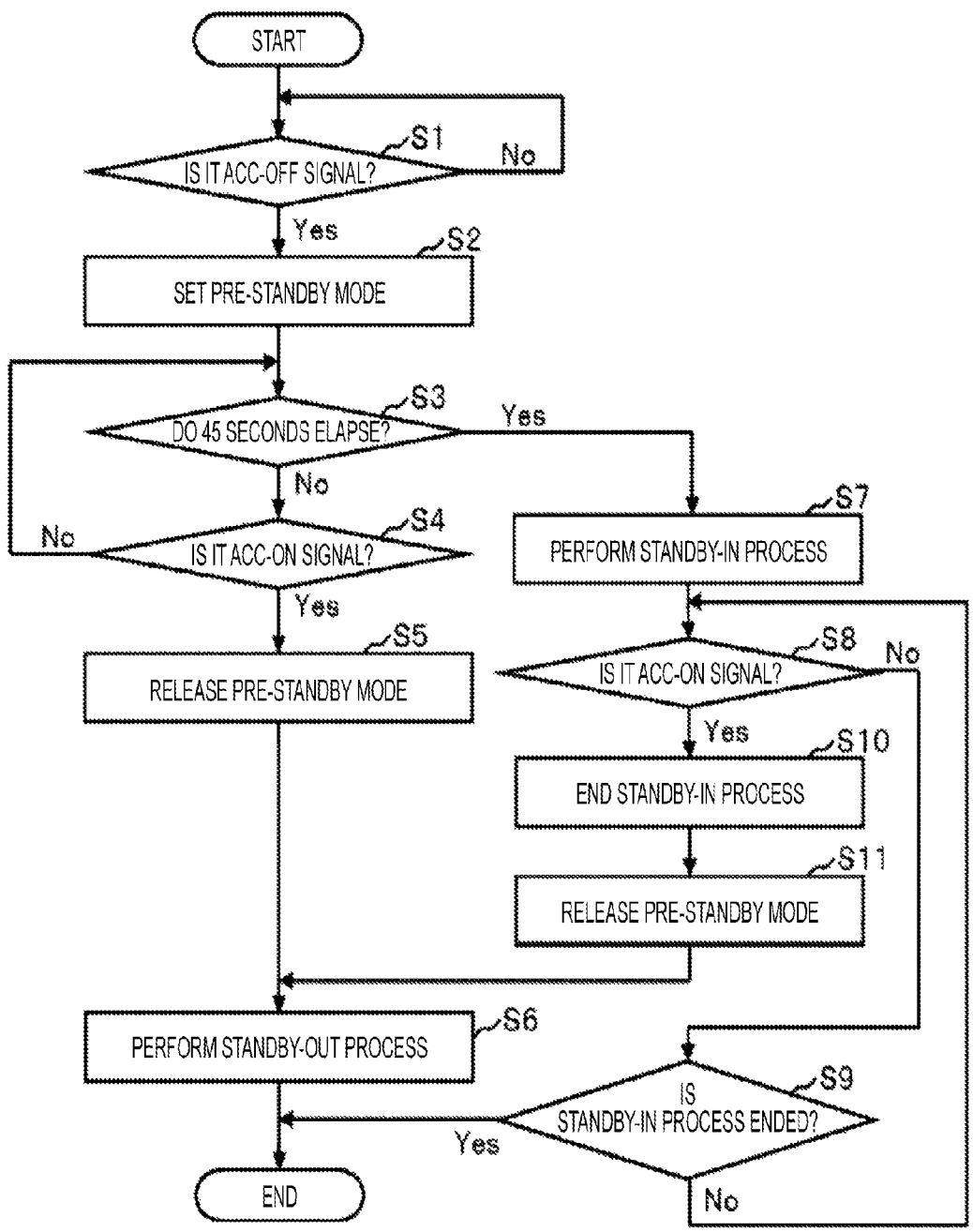
FIG. 6 is a flowchart illustrating an operation example of the in-vehicle device according to the embodiment in which the in-vehicle device is operated in a normal operation state.
Figure 7:
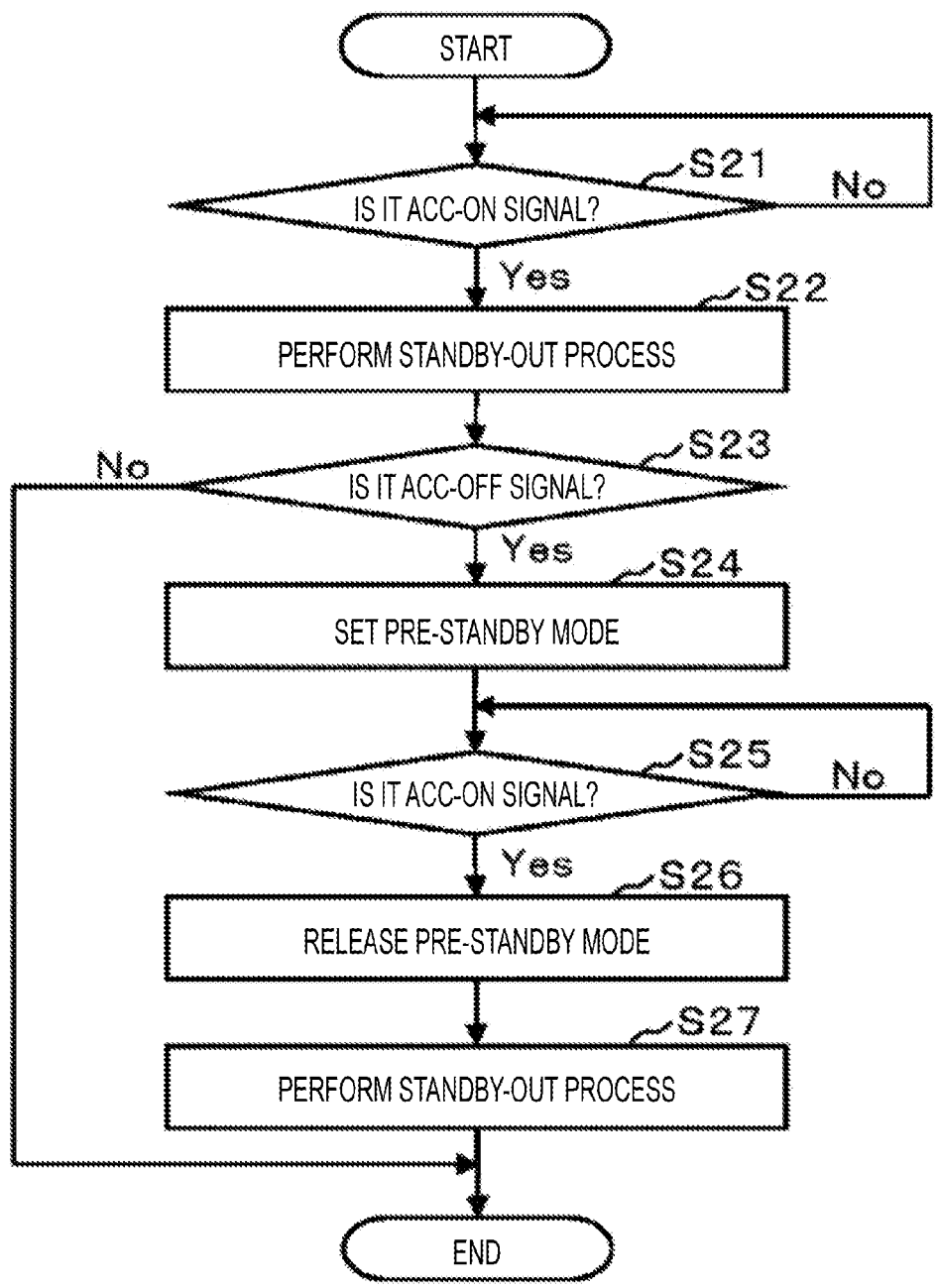
FIG. 7 is a flowchart illustrating an operation example of the in-vehicle device according to the embodiment in which the in-vehicle device is operated in a standby state.
Figure 8:
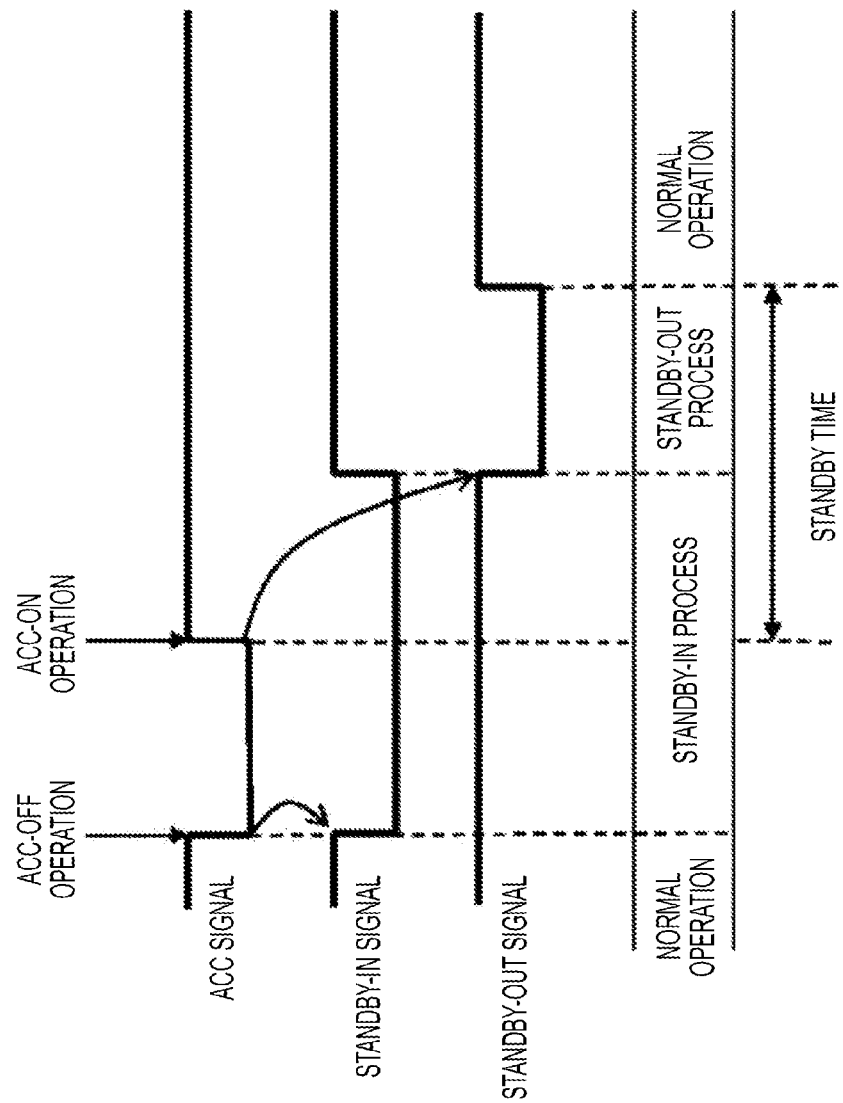
FIG. 8 is a diagram for describing a problem in the related art.

FIGS. 6 and 7 are flowcharts illustrating operation examples of the in-vehicle device 100 according to the embodiment having the above configuration. Herein, FIG. 6 illustrates an operation example performed when the in-vehicle device 100 is in a normal operation state. FIG. 7 illustrates an operation example performed when the in-vehicle device 100 is in the standby state. First, the operation example when the in-vehicle device 100 is in the normal operation state will be described based on FIG. 6. Further, the flowchart illustrated in FIG. 6 is started when the user performs the ACC-OFF operation.

First, the mode control unit 21 determines whether the ACC-OFF signal output from the ACC control unit 10 is detected (Step S1). In a case where the ACC-OFF signal is detected, the mode control unit 21 sets the pre-standby mode to the in-vehicle device 100 (Step S2). Thereafter, the mode control unit 21 determines whether a predetermined time (45 seconds) elapses after the setting of the pre-standby mode (Step S3).

Herein, in a case where the predetermined time does not elapse, the mode control unit 21 determines whether the ACC-ON signal output from the ACC control unit 10 is detected (Step S4). In a case where the ACC-ON signal is not detected, the procedure returns to Step S3. On the other hand, in a case where the ACC-ON signal is detected, the mode control unit 21 releases the setting of the pre-standby mode (Step S5). Then, the standby-out process control unit 23 controls the standby process execution unit 40 to perform the standby-out process (Step S6). This flow corresponds to the operation illustrated in FIG. 2.

In a case where the mode control unit 21 determines that the predetermined time (45 seconds) elapses since the pre-standby mode is set in Step S3, the standby-in process start control unit 22A controls the standby process execution unit 40 to perform the standby-in process (Step S7). Thereafter, the standby-in process end control unit 22B determines whether the ACC-ON signal is detected during the standby-in process (Step S8).

In a case where the ACC-ON signal is not detected during the standby-in process, the standby-in process end control unit 22B determines whether the standby-in process is normally ended (Step S9). In a case where the standby-in process is not ended, the procedure returns to Step S8. On the other hand, in a case where the standby-in process is ended, the in-vehicle device 100 enters the standby state, and the process of the flowchart illustrated in FIG. 6 is ended. This flow corresponds to the operation illustrated in FIG. 3.

In Step S8, in a case where the ACC-ON signal is detected during the standby-in process, the standby-in process end control unit 22B controls the standby-in process to be forcibly ended (Step S10). Then, the mode control unit 21 releases the setting of the pre-standby mode (Step S11). Thereafter, the standby-out process control unit 23 controls the standby process execution unit 40 to perform the standby-out process (Step S6). This flow corresponds to the operation illustrated in FIG. 4.

Next, the operation example when the in-vehicle device 100 is in the standby state will be described based on FIG. 7. Further, the flowchart illustrated in FIG. 7 is started when the user performs the ACC-ON operation.

First, the standby-out process control unit 23 determines whether the ACC-ON signal output from the ACC control unit 10 is detected (Step S21). In a case where the ACC-ON signal is detected, the standby-out process control unit 23 controls the standby process execution unit 40 to perform the standby-out process (Step S22).

Thereafter, the mode control unit 21 determines whether the ACC-OFF signal output from the ACC control unit 10 is detected (Step S23). Herein, since the in-vehicle device 100 has not a specific specification that the ACC-ON signal, the ACC-OFF signal, and the ACC-ON signal are serially output when the user performs the ACC-ON operation, in a case where the ACC-OFF signal is not detected, the flowchart illustrated in FIG. 7 is ended. This flow corresponds to the operation illustrated in FIG. 3.

On the other hand, in a case where the ACC-OFF signal is detected immediately after the standby process execution unit 40 performs the standby-out process, it corresponds to the in-vehicle device 100 having a specific specification that the ACC-ON signal, the ACC-OFF signal, and the ACC-ON signal are serially output. In this case, the mode control unit 21 sets the pre-standby mode to the in-vehicle device 100 (Step S24).

Thereafter, the mode control unit 21 determines whether the ACC-ON signal output from the ACC control unit 10 is detected (Step S25). In a case where the ACC-ON signal is not detected, the determination of Step S25 is repeatedly performed. On the other hand, in a case where the ACC-ON signal is detected, the mode control unit 21 releases the setting of the pre-standby mode (Step S26). Then, the standby-out process control unit 23 controls the standby process execution unit 40 to perform the standby-out process subsequently to the end of the standby-out process performed in Step S22 (Step S27). This flow corresponds to the operation illustrated in FIG. 5.

As described above in detail, according to the embodiment, in a case where the ACC-ON operation is performed after the user performs the ACC-OFF operation, it is possible to shorten a time taken until the in-vehicle device 100 enters the operable state after the ACC-ON operation is performed. In addition, when the user performs the ACC-ON operation, it is possible to shorten a time taken until the in-vehicle device 100 enters the operable state after the ACC-ON operation is performed even in the in-vehicle device 100 which is configured to serially output the ACC-ON signal, the ACC-OFF signal, and the ACC-ON signal. It is possible to satisfy the American standard that a captured image of the periphery of the vehicle has to be displayed in 2 seconds after the ACC-ON operation even in any case.

Further, the above embodiment has been described about the in-vehicle device 100 as an example of the electronic device, but the invention is not limited thereto. The above embodiment can also be similarly applied to any electronic device as long as the electronic device performs the standby-in process according to the power-off operation and the standby-out process according to the power-on operation.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A standby process controller of an electronic device comprising:
   a mode controller that stops audio and image output according to a power-off signal of an electronic device, sets a pre-standby mode to the electronic device so as to allow a standby-in process to be started and ended at any time, and releases the setting of the pre-standby mode according to a detection of a power-on signal of the electronic device; and
   a standby-in process start controller that is on standby without starting the standby-in process when the power-off signal is detected, and controls the standby-in process to be started in a case where the power-on signal is not detected within a predetermined time since the pre-standby mode is set by the mode controller and the predetermined time elapses.

2. The standby process controller of the electronic device according to claim 1, further comprising:
   a standby-in process end controller that ends the standby-in process in a case where the power-on signal of the electronic device is detected after the standby-in process start controller controls the standby-in process to be started when the predetermined time elapses since the pre-standby mode is set by the mode controller.

3. The standby process controller of the electronic device according to claim 1, further comprising:
   a standby-out process controller that, when the power-on signal of the electronic device is detected within the predetermined time since the pre-standby mode is set by the mode controller, starts the standby-out process.

4. The standby process controller of the electronic device according to claim 3, wherein the standby-out process controller starts the standby-out process in synchronization with the detection of the power-on signal within the predetermined time since the pre-standby mode is set by the mode controller.

5. The standby process controller of the electronic device according to claim 4, wherein the standby-out process controller starts the standby-out process immediately after the detection of the power-on signal within the predetermined time since the pre-standby mode is set by the mode controller.

6. A standby process control method of an electronic device comprising:
- a first step of causing a mode controller of an electronic device to stop audio and image output according to a detection of a power-off signal of the electronic device, and to set a pre-standby mode to the electronic device so as to allow a standby-in process to be started and ended at any time;
- a second step of causing the mode controller to release the setting of the pre-standby mode in a case where a power-on signal of the electronic device within a predetermined time since the pre-standby mode is set;
- a third step of causing a standby-in process start controller of the electronic device to start the standby-in process when the predetermined time elapses in a case where the power-on signal is not detected within the predetermined time after the pre-standby mode is set while the pre-standby mode is still set; and
- a fourth step of causing the mode controller to release the pre-standby mode in a case where the power-on signal of the electronic device is detected after the standby-in process is started in the third step and the standby-in process is ended.

7. The standby process control method of the electronic device according to claim 6, further comprising:
- a fifth step of causing a standby-in process end controller to end the standby-in process in a case where the power-on signal of the electronic device is detected during the standby-in process after the standby-in process is started in the third step.

8. The standby process control method of the electronic device according to claim 6, further comprising:
- a sixth step of causing a standby-out process controller to start the standby-out process when the power-on signal of the electronic device is detected within the predetermined time since the pre-standby mode is set by the mode controller.

9. The standby process control method of the electronic device according to claim 8, wherein the standby-out process controller starts the standby-out process in synchronization with the detection of the power-on signal within the predetermined time since the pre-standby mode is set by the mode controller.

10. The standby process control method of the electronic device according to claim 9, wherein the standby-out process controller starts the standby-out process immediately after the detection of the power-on signal within the predetermined time since the pre-standby mode is set by the mode controller.

* * * * *